US012498094B2

(12) United States Patent
Bajec Strle et al.

(10) Patent No.: US 12,498,094 B2
(45) Date of Patent: Dec. 16, 2025

(54) CLAMPING MEANS FOR A LIGHT GUIDE ELEMENT AND LIGHT GUIDE ELEMENT ARRANGEMENT WITH SUCH A CLAMPING MEANS

(71) Applicant: Hella Saturnus Slovenija d.o.o., Ljubljana (SI)

(72) Inventors: Alenka Bajec Strle, Ljubljana (SI); Alen Bucar, Trebnje (SI); Rok Stante, Ljubljana (SI); Andraz Tekavcic, Ljubljana (SI); Andrej Wagner, Ljubljana (SI)

(73) Assignee: Hella Saturnus Slovenija d.o.o., Ljubljana (SI)

( * ) Notice: Subject to any disclaimer, the term of this patent is extended or adjusted under 35 U.S.C. 154(b) by 0 days.

(21) Appl. No.: 18/797,797

(22) Filed: Aug. 8, 2024

(65) Prior Publication Data
US 2025/0060082 A1  Feb. 20, 2025

(51) Int. Cl.
*F21S 41/29* (2018.01)
*B60Q 3/62* (2017.01)
(Continued)

(52) U.S. Cl.
CPC .............. *F21S 41/29* (2018.01); *B60Q 3/62* (2017.02); *F21S 41/24* (2018.01); *F21S 43/237* (2018.01); *F21S 43/27* (2018.01)

(58) Field of Classification Search
CPC .... G02B 6/364; G02B 6/3636; G02B 6/3632; G02B 6/3644; G02B 1/045; G02B 6/3616; G02B 6/001; F21V 15/04; F21V 15/012; F21V 17/104; F21V 17/107; F21V 17/108; F21V 17/164; F21V 17/162; F21V 17/18; F21V 2200/00; F21V 17/10; F21S 43/237; F21S 41/24; F21S 43/235; F21S 43/27; F21S 43/245; F21K 9/61; F21W 2107/10; F21W 2106/00; B60R 3/002; B60Q 3/217; B60Q 3/20; B60Q 3/208; B60Q 3/292; B60Q 3/267; B60Q 3/258; B60Q 3/252;
(Continued)

(56) References Cited

U.S. PATENT DOCUMENTS

| | | | | |
|---|---|---|---|---|
| 5,704,573 A | * | 1/1998 | de Beers | F16L 3/237 248/74.2 |
| 6,523,986 B1 | * | 2/2003 | Hoffmann | E04F 19/02 362/374 |

(Continued)

FOREIGN PATENT DOCUMENTS

| | | |
|---|---|---|
| DE | 102015103850 A1 | 9/2016 |
| DE | 102017111805 A1 | 12/2017 |

(Continued)

*Primary Examiner* — Omar Rojas Cadima
(74) *Attorney, Agent, or Firm* — Husch Blackwell LLP

(57) ABSTRACT

A clamping means for a light guide element includes a receiving section for receiving the light guide element, and a fastening section for fastening the clamping means (and thus the light guide element) to a structure element. The clamping means features two clamping sections connected to each other by a hinge. When the clamping sections are opened to each other, the light guide element can be inserted into or removed from the receiving section. When the clamping sections are closed to each other, the light guide element is hold in the receiving section.

14 Claims, 3 Drawing Sheets

(51) Int. Cl.
  *F21S 41/24*    (2018.01)
  *F21S 43/237*   (2018.01)
  *F21S 43/27*    (2018.01)

(58) Field of Classification Search
  CPC ........ B60Q 3/242; B60Q 3/233; B60Q 3/225;
              B60Q 3/275; B60Q 3/283; B60Q 3/229;
              B60Q 3/10; B60Q 3/12; B60Q 3/14;
              B60Q 1/247; B60Q 1/245; B60Q 1/22;
              B60Q 1/02; B60Q 1/0408; B60Q 1/16;
              B60Q 1/04; B60Q 3/62; B60Q 3/78;
                                        F16B 2/10
  See application file for complete search history.

(56) References Cited

U.S. PATENT DOCUMENTS

| | | |
|---|---|---|
| 2014/0160787 A1 | 6/2014 | Rudek et al. |
| 2019/0001877 A1 | 1/2019 | Unger et al. |

FOREIGN PATENT DOCUMENTS

| | | | |
|---|---|---|---|
| DE | 102019110776 A1 | 11/2019 | |
| DE | 102020117202 A1 | 12/2021 | |
| DE | 102021117619 A1 | 1/2023 | |
| EP | 3821169 B1 | 3/2022 | |
| WO | WO-2004078518 A1 * | 9/2004 | ......... B29C 44/1271 |
| WO | 2007047304 A1 | 4/2007 | |

* cited by examiner

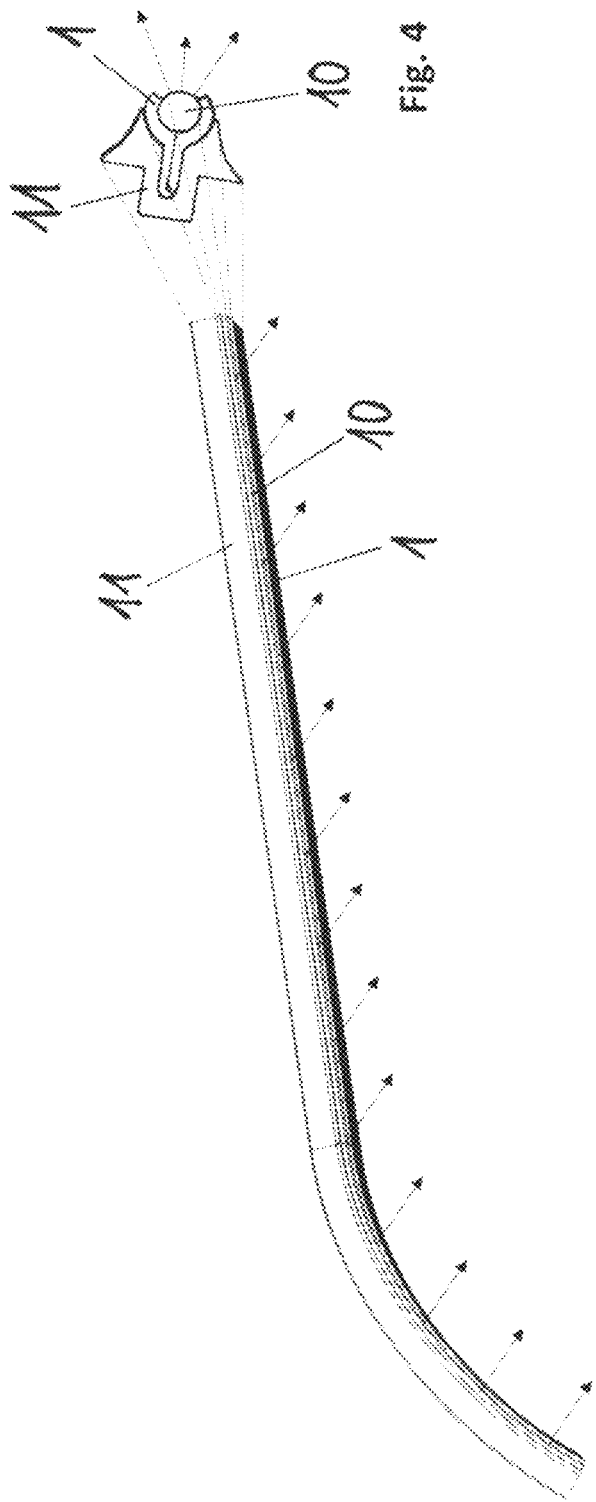

CLAMPING MEANS FOR A LIGHT GUIDE ELEMENT AND LIGHT GUIDE ELEMENT ARRANGEMENT WITH SUCH A CLAMPING MEANS

CROSS REFERENCE

This application claims priority to EU Application No. EP 23191254.4, filed Aug. 14, 2023, the entirety of which is hereby incorporated by reference.

FIELD OF THE INVENTION

The present invention relates to a clamping means for a light guide element, whereas the clamping means features a receiving section for receiving the light guide element and a fastening section for fastening the clamping means and thus the light guide element to a structure element.

BACKGROUND OF THE INVENTION

The documents DE 10 2019 110 776 A1 and EP 3 821 169 B1 disclose different clamping means for fastening a light guide element to a structure element, e.g. in the headlight of a vehicle. To form a fastening arrangement of a light guide element to a structure element, usually clamping means feature a receiving section for receiving the light guide element, e.g. performed as a clip, and clamping means features a fastening section for fastening the clamping means to the structure element, whereas the fastening section usually forms a pin or a hole contour, or the clamping means is fastened to the structure elements by means of gluing, welding, screws or riveted joints.

Usually, when the light guide element is made of a material with a stable shape, it is almost sufficient to apply clamping means in discrete intervals. When the light guide element has a soft behavior, in the most cases the clamping means must extend along the entire length of the light guide element to ensure its safe fastening to the structure element. Regardless of the flexible behavior of the light guide element, it is crucial in which circumference the light guide element is implemented.

Light guide elements are known for headlights, real lights, interior illumination, and light guide elements are nowadays also known for the light design of car seats, see US 2019/0001877 A1.

In FIG. 1 are shown different fixation possibilities for a light guiding element 10 which has to be fixed to a structure element 11. The depiction I uses a glue 19 to fix the light guiding element 10 to the structure element 11, and the light guide element 10 is arranged in a recess 20.

The solution of depiction 11 fixes the light guide element 10 to the structure element 11 by means of a separate clip element 21, which clip element 21 must be clipped on the structure element 11, whereas an additional mounting part is necessary.

The solution according to depiction III shows the light guide element 10 arranged in a recessed 20 in the structure element 11 without a positive fit due to the missing undercut section. Compared to the solution according to depiction III, the solution shown in the depiction IV shows a clip-in or snap-in situation of the light guide element 10 into the structure element 11. This solution requires a snap-in of the light guide element 10 into the structure element 11, but there is a limitation with regards to the overhang to form the positive fit, which can be made by the production tool to manufacture the structure element 10, in particular the deforming situation of the plastic part 11 out of the molding tool.

The solution V makes use of a clip-in-structure element 11 to entirely enclose the light guide element 10, but the structure element 11 must be translucent in order to enable the light passing the structure element 11.

BRIEF SUMMARY OF THE INVENTION

It is an object of the invention to provide a clamping means for fixation of a light guide element to a structure element, having an easy design, which is easy to produce in a molding process or an extrusion processing and which can reliable clamp the light guide element, in particular when the material of the light guide element is soft and flexible.

The invention discloses clamping means, whereas the clamping means features two clamping sections, whereas the clamping sections are connected to each other by a hinge, whereas when the clamping sections are opened to each other, the light guide elements can be inserted into or removed from the receiving section and when the clamping sections are closed to each other, the light guide element is hold in the receiving section. The invention is a design of a clamping means to receive the light guide elements like a gripper with two clamping sections opposite to each other, and the light guide element can be clamped with a positive fit inside the fastening section. The clamping means can be produced easily, in particular the clamping sections can be produced by injection molding when they are in an opened state. The clamping are easy to fasten to the structure element without the use of tools, screws, glue or other helping means, and the light guide element can be easily inserted into the receiving section of the clamping means.

According to a preferred embodiment, the receiving section forms a circular section, which section is formed to enclose the light guide element by an angle of more than 100° when the clamping sections are closed to each other. When the enclosure of the receiving section with respect to a circular cross section of the light guide element is more than 180°, the light guide element is received in the clamping means with an overhang, and thus a positive fit holds the light guide element.

According to yet another embodiment the receiving section forms a remaining opening section for passing light emitted by the light guide element when the clamping sections are closed to each other. The rest of the remaining opening section features an opening angle of 90° to 130° or 100° to 120° or 110°.

This leads to the advantage, that no section of the clamping means must be translucent, and the light which is emitted by the light guide element must not pass a part of the clamping means.

Advantageously, the inner surface of the circular section features a light reflection coating which e.g. can be made of aluminum which reflects the light emitted by the light guide element. The light which can be reflected by the light reflection coating can additionally pass the remaining opening section of the receiving section for a maximal light emitting efficiency.

The fastening section of the clamping means can mainly be formed by insertion legs of the clamping sections, which are arranged parallel to each other when the clamping sections are closed to each other. When the clamping means features a longitudinal extension along the extension of the light guide elements, the fastening section forms a kind of a fin, which can be inserted into a slot of the structure element, in particular with a light positive feature or with an undersized measure of the slit in the structure element to ensure a durable fixation.

The insertion legs are arranged between the circular section and the hinge of the clamping means. The hinge forms a symmetry point or a symmetry line of the clamping means, and both clamping sections feature an insertion leg and a circular section, and the insertion legs are interconnected by the hinge.

According to another advantage, the hinge is an integral hinge, whereas the clamping sections and the hinge are formed as a one-piece part by injection molding or by extrusion processing made from plastic material. Such film joints, forming a hinge can be easily produced together with the components joined by the film joint.

Advantageously, the two clamping sections are symmetric to each other, and the symmetric axis is formed by the hinge. At least the receiving section or the entire clamping means features a longitudinal extension in such a way that light guide elements can be received by the receiving section over the entire length. Alternatively, a number of clamping means are used as fastening elements to fasten a single light emitting element, and the clamping means are positioned in discrete distances along the light guide element.

The object of the present invention is also solved by a light guide element arrangement having a light guide element, which is fastened to a structure element with the features as described above.

In particular, the light guide element can be clamped in between the receiving sections of the two clamping sections, while the fastening sections are inserted into a slot of the structure element, causing the clamping effect. The fastening section can form a friction fit and/or a positive fit to the slot in the structure element. Alternatively, the fastening section can be glued or fixed by screws into the slot of the structure element.

The clamping means can feature a length which is aligned to the length of the light guide element. This leads to a full clamping of the light guide element along the entire length of the light guide element, which leads to a constant light emitting line defined by the opening section of the clamping means.

The structure element can form an element of a lighting means of a vehicle, in particular a headlight or a real light, an interior light assembly of a vehicle, a part of the interior lining of a vehicle, a seat, a dashboard, a door panel of a vehicle, a plane, a rail car of the like.

The aforementioned components as well as the claimed components and components to be used in accordance with the invention in the described embodiments, are not subject to any special exceptions with respect to their size, shape, material selection and technical concept such that the selection criteria known in the pertinent field can be applied without limitations.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 4 is a three-dimensional view of the light guide element clamped in the clamping means with an additional cross-sectional view.

DETAILED DESCRIPTION OF THE DRAWINGS

Figure 1:
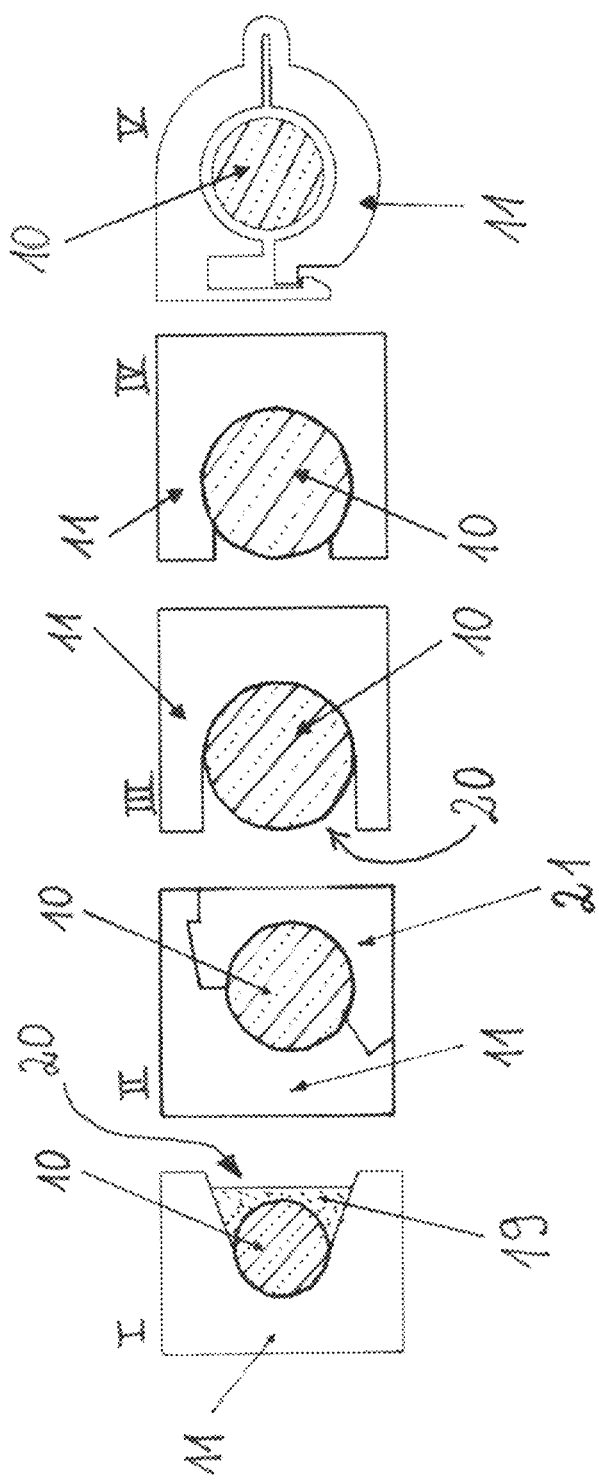
FIG. 1 illustrates known clamping systems I to V according to prior art solutions for clamping a light guide element to a structure element.

FIG. 1 shows different fastening designs for fastening a light guide element 10 to a structure element 11 as already described in the introduction part of the description.

Figure 2:
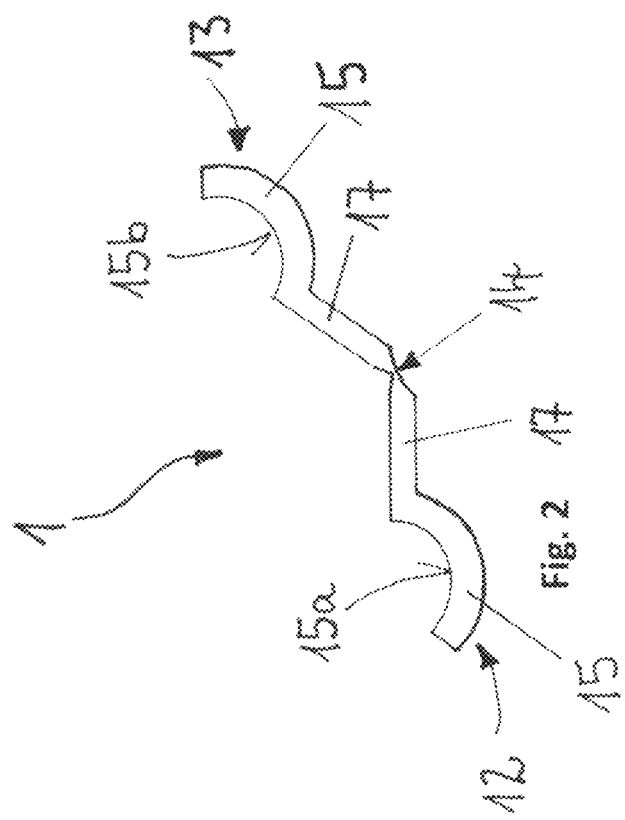
FIG. 2 is a cross sectional view of the clamping means according to the invention.

FIG. 2 shows an embodiment of the clamping means 1 in an open state, so that the clamping sections 12, 13 are opened to each other and are joined by the hinge 14. The clamping sections 12, 13 comprise circular intersections 15 with an inner surface 15a, which can be coated by a reflection coating like aluminum, silver or the like, and down to the hinge 14 the clamping sections 12, 13 comprise insertion legs 17.

Figure 3:
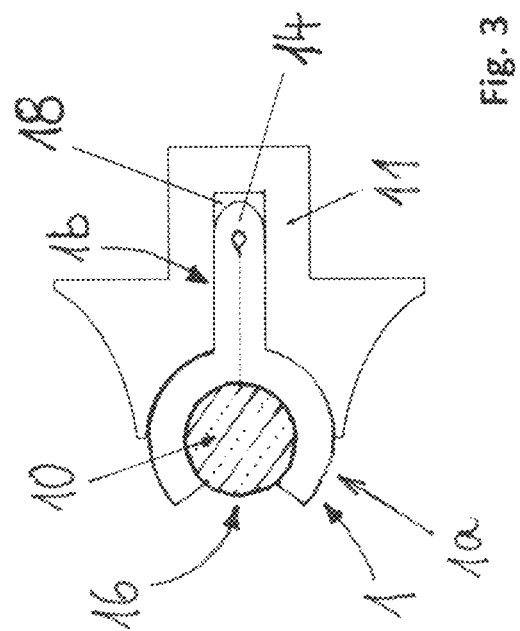
FIG. 3 illustrates the clamping means with the light guide element received in a receiving section and the fastening section of the clamping means is applied to a structure element.

FIG. 3 shows the clamping means 1 while fastening a light guide element 10 and the clamping means 1 is sticked into a slot 18 of the structure element 11. The light guide element 10 is received in the receiving section 1a, and the fastening of the clamping means 1 is formed with the fastening section 1b sticked into the slot 18 of the structure element 11. The receiving section 1a it is mainly formed by the circular section 15 and the fastening section 1b is mainly formed by the insertion legs 17 and the hinge 14, respectively.

The circular section 15 encloses the light guide element 10 with an angle of more than 180° to enable a positive fit of the light guide element 10 in the clamping means 1. This leads to a remaining opening section 16, and light, which is emitted by the light guide element 10 can pass the opening section 16.

FIG. 4 shows an embodiment of a light guide element 10 which is fastened by a clamping means 1 to a structure element 11, which is depicted in a flying situation for a better view. The depiction shows that clamping means 1 features the same length like length of the light guide element 10, and as a result, the arrangement emits a light line with a light emitting over the entire length of the light guide element 10.

The present invention is not limited by the embodiment described above, which is represented as an example only and can be modified in various ways within the scope of protection defined by the appending patent claims. Thus, the invention is also applicable to different embodiments, in particular of the cross section of the light guide element 10, whereas the receiving section 1a can be aligned with the cross section of the light guide element 10, e.g. having a rectangular, an oval or a polygon shape.

LIST OF NUMERALS 1 clamping means
1a receiving section
1b fastening section
10 light guide element
11 structure element
12 clamping section
13 clamping section
14 hinge
15 circular section
15a inner surface
16 opening section 17 insertion legs
18 slot
19 glue
20 recess
21 separate clip element
100 light guide element arrangement

We claim:

1. A clamping means for a light guide element, the clamping means comprising:
   a receiving section for receiving the light guide element;
   a fastening section for fastening with a structure element; and
   two clamping sections connected to each other by a hinge, wherein when the clamping sections are opened to each other, the light guide element can be inserted into or removed from the receiving section, and wherein when the clamping sections are closed to each other, the light guide element is held in the receiving section;
   wherein the receiving section forms a circular section when the clamping sections are closed to each other;
   wherein the fastening section is mainly formed by insertion legs of the clamping sections, and the insertion legs are arranged parallel when the clamping sections are closed to each other; and
   wherein the insertion legs are arranged between the circular section and the hinge.

2. The clamping means according to claim 1, wherein the circular section formed by the receiving section when the clamping sections are closed to each other encloses the light guide element more than 180°.

3. The clamping means according to claim 1, wherein the receiving section forms a remaining opening section for passing light emitted by the light guide element when the clamping sections are closed to each other, wherein the remaining opening section has an opening angle of 90° to 130°.

4. The clamping means according to claim 1, wherein a surface of the circular section has a light reflection coating.

5. The clamping means according to claim 1, wherein the hinge is an integral hinge, wherein the clamping sections and the hinge are formed as a one-piece by injection molding or by extrusion processing made from plastic material.

6. The clamping means according to claim 1, wherein the two clamping sections are symmetric, and a symmetric axis of the two clamping sections falls into the hinge.

7. The clamping means according to claim 1, wherein at least the receiving section or the entire clamping means features a longitudinal extension in such a way that the light guide element can be received by the receiving section over the entire length.

8. A light guide element arrangement having a light guide element which is fastened to a structure element by a clamping means according to claim 1.

9. The light guide element arrangement according to claim 8, wherein the light guide element is clamped in the receiving section between the two clamping sections, while the fastening section is inserted into a slot of the structure element, causing the clamping effect.

10. The light guide element arrangement according to claim 8, wherein the fastening section forms a friction fit and/or a positive fit to the slot in the structure element.

11. The light guide element arrangement according to claim 8, wherein the fastening section is glued into or screwed to the slot of the structure element.

12. The light guide element arrangement according to claim 8, wherein the clamping means has a length which is aligned to the length of the light guide element.

13. The light guide element arrangement according to claim 8, wherein the structure element forms an element of a lighting means of a car.

14. The light guide element arrangement according to claim 13, wherein the structure element forms a head light or a rear light, an interior light assembly of a car, a part of the interior lining of a car, a seat, a dashboard, or a door panel of a car.

* * * * *